United States Patent

Gösse et al.

[11] Patent Number: 4,659,138
[45] Date of Patent: Apr. 21, 1987

[54] DEVICE FOR FASTENING A MOTOR VEHICLE WINDOW, ESPECIALLY A WINDSHIELD OR A REAR WINDOW

[75] Inventors: August-Wilhelm Gösse, Mönsheim; Nikolaus Winhart, Glonn, both of Fed. Rep. of Germany

[73] Assignee: Dr. Ing. H.c.F. Porsche Aktiengesellschaft, Fed. Rep. of Germany

[21] Appl. No.: 776,767

[22] Filed: Sep. 16, 1985

[30] Foreign Application Priority Data

Sep. 14, 1984 [DE] Fed. Rep. of Germany ....... 3433784

[51] Int. Cl.⁴ ............ B60J 1/00; B62D 39/00; F16H 21/44
[52] U.S. Cl. .................. 296/201; 296/84 A; 74/104; 74/577 SF; 52/766; 52/768
[58] Field of Search ........... 296/84 R, 84 A, 201; 52/208, DIG. 1, 766–768; 411/529; 24/701; 74/104, 577 SF

[56] References Cited

U.S. PATENT DOCUMENTS

| | | | |
|---|---|---|---|
| 1,649,919 | 11/1927 | Nelson | 52/766 |
| 3,122,048 | 2/1964 | Warner | 29/240 |
| 3,142,149 | 7/1964 | Hays | 74/577 SF |
| 3,683,737 | 8/1972 | Oetiker | 411/529 |
| 4,037,563 | 7/1977 | Pflueger | 52/208 |
| 4,235,056 | 11/1980 | Griffin | 52/208 |
| 4,561,689 | 12/1985 | Sprenger | 296/84 A |

FOREIGN PATENT DOCUMENTS

| | | | |
|---|---|---|---|
| 233226 | 4/1964 | Austria | 52/766 |
| 236615 | 11/1964 | Austria | 52/766 |
| 1005389 | 3/1957 | Fed. Rep. of Germany | 296/84 R |
| 1942343 | 3/1971 | Fed. Rep. of Germany | 52/208 |
| 480517 | 5/1953 | Italy | 411/529 |
| 212102 | 4/1967 | Sweden | 52/208 |
| 945894 | 1/1964 | United Kingdom | 52/766 |
| 1052020 | 12/1966 | United Kingdom | 52/766 |

Primary Examiner—Robert B. Reeves
Assistant Examiner—Dennis H. Pedder
Attorney, Agent, or Firm—Barnes & Thornburg

[57] ABSTRACT

A device for fastening a motor vehicle window is detachably connected to the body frame of a motor vehicle. The device is composed of a holding plate attached to the body frame, and a supporting element connected to the holding plate. The lower edge of the window always rests on the supporting element with a relatively large contact area, thereby preventing stress induced breakage. Also included is a control element which adjusts the position of the supporting element relative to the holding plate, thereby allowing the window to be properly positioned along the window plane before fixing it to the body frame by an adhesive.

18 Claims, 11 Drawing Figures

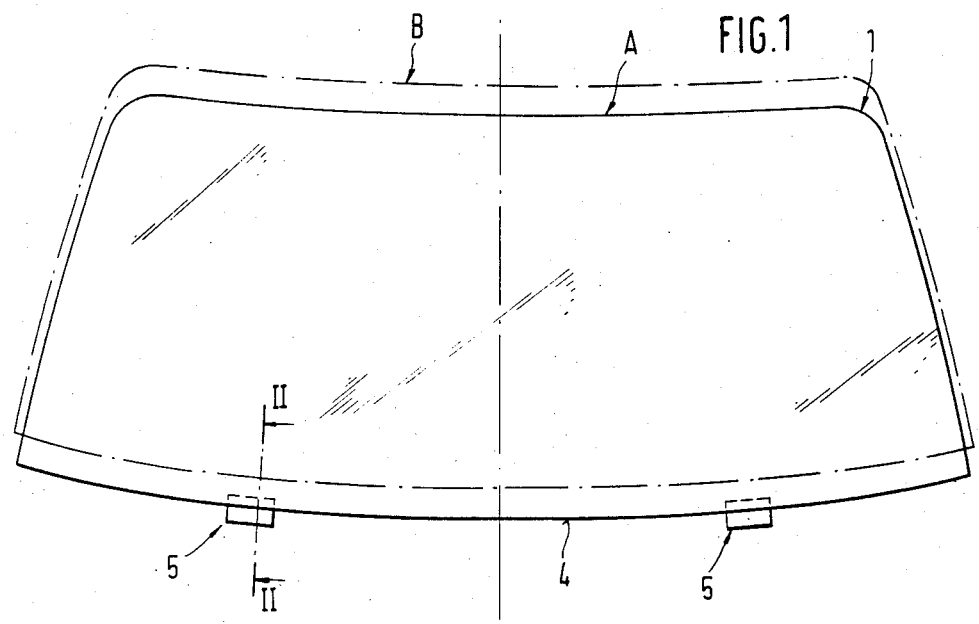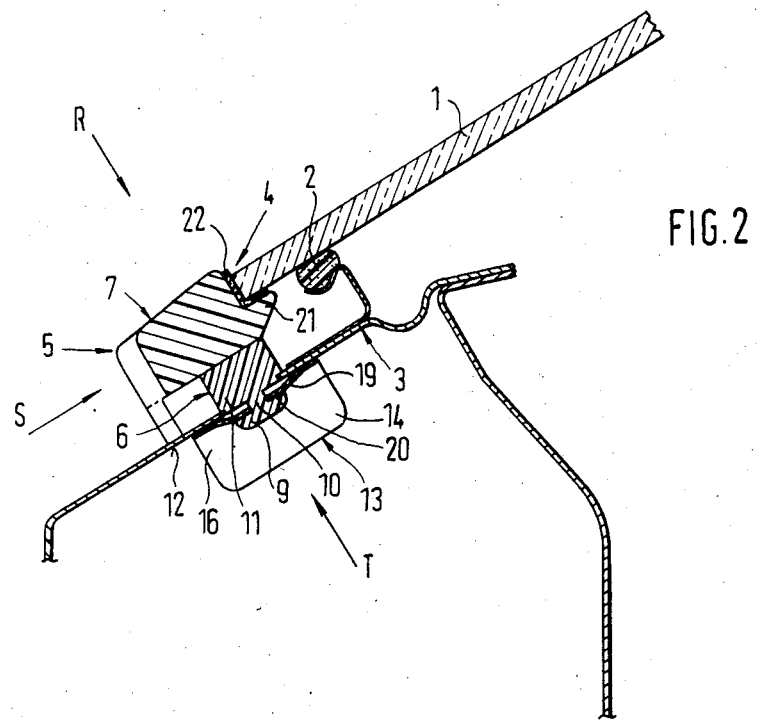

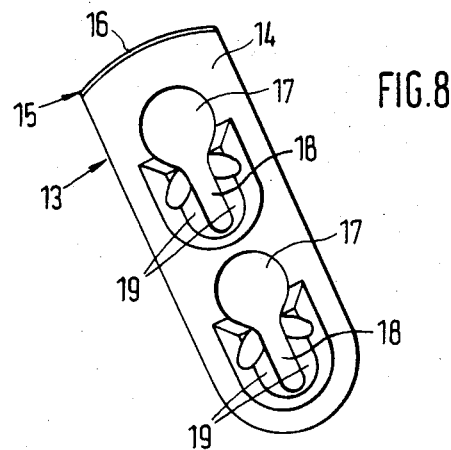
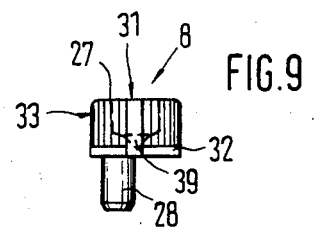
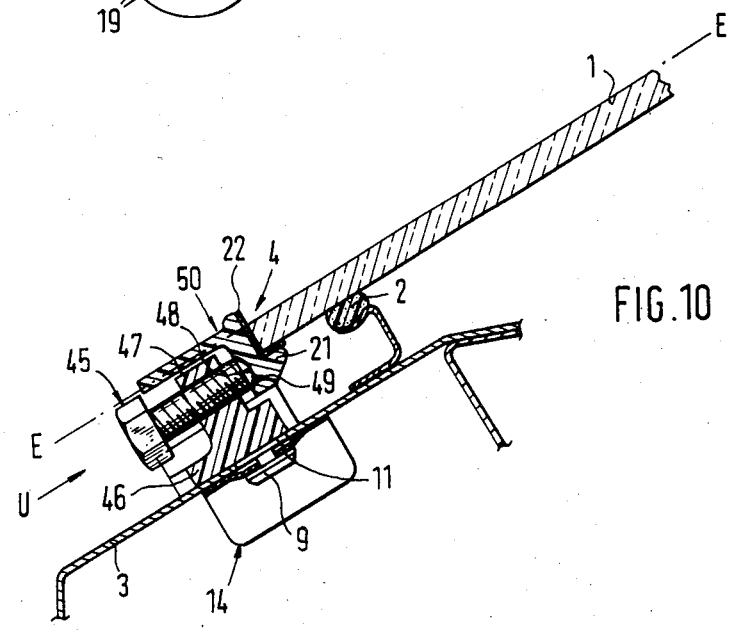
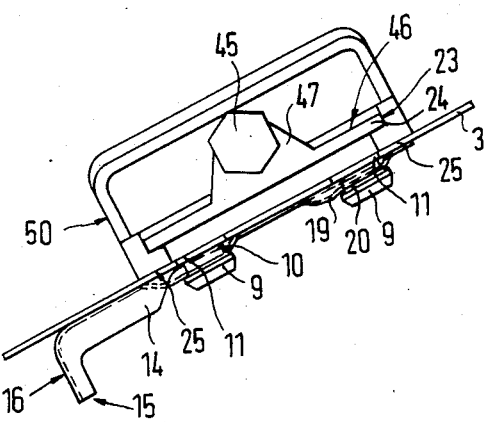

DEVICE FOR FASTENING A MOTOR VEHICLE WINDOW, ESPECIALLY A WINDSHIELD OR A REAR WINDOW

BACKGROUND AND SUMMARY OF THE INVENTION

This invention relates to a device for the fastening of a motor vehicle window, especially a windshield or a rear window, at a stationary body frame, whereby the fixing of the window is accomplished by means of adjustable holding elements that preferably affect the lower edge of the window.

DE-AS No. 1 259 079 describes a holding element for a glass pane which consists of a pressure rail and an eccentric control element. The direction of the effect of the control element in this arrangement extends vertically to the plane of the window.

In addition, U.S. Pat. No. 4,006,571 shows control elements at one holding element that act in the plane of a glass pane.

Both above-mentioned designs are intended for windows in buildings.

For the panes of vehicle windows, E-PA No. 0 109 621 shows arranging of holding elements which affect the lower edge of the window, thereby adjusting the window. These holding elements are formed by rotatable and fixable eccentrics on which the lower edge of the window rests directly, the area of the eccentric interacting with the edge of the pane having the shape of a cam. The disadvantage of this construction is that for possible intermediate positions, the window rests on the cam in a punctiform manner which, especially during the driving operation, may result in high stress leading to the breakage of the window. In addition, a special tool is required for the adjustment. Also, the mounting of the eccentric is difficult for one person to carry out because the eccentric, on the one side, must be held in an adjusted position by means of the special tool and, on the other side, a pin must be driven in for fixing the position of the eccentric.

It is an objective of the invention to improve a holding element for a window fastening such that it can be mounted simply and supports the window in all possible installing conditions securely.

The above and other objects of the invention are attained by a device that supports and positions the window to be fixed to the body frame. In a preferred embodiment of the device, a holding element is comprised of a holding plate and a supporting element. The holding plate is firmly connected to the body frame of the motor vehicle. The supporting element, which supports the lower edge of the window, is adjustable in relation to the holding plate by means of a control element. The control element is interposed between the supporting element and the holding plate. Adjusting the supporting element with the control element positions the window to be fixed to the body frame.

An alternative embodiment of the device is contemplated in which a screw is substituted as the control element for the eccentric control element of the first embodiment.

The main advantages achieved by means of the two preferred embodiments of the invention are that the window glass in all positions rests on the supporting element over a relatively large area; the holding element can be operated easily; and the control element can be operated by means of a simple standard tool.

The spring provided in the supporting element secures the control element against an axial shifting and also holds it in its adjusted position, such that a self-acting shifting under the force of the windshield, for example, is prevented.

The holding plate and the supporting elements are simple parts that are easy to manufacture and interact well with one another because of their engaging design.

For the fastening of the holding plate, bearing shafts equipped with heads project through openings of the body frame and can be fixed easily by means of simple spring clips. Because of the movable bearing of the supporting element at the holding plate, the supporting element continuously adjusts itself into the correct position with respect to the edge of the window glass so that a relatively large contact surface area of the window glass always rests against the body frame which avoids breakage of the window during the driving operation.

Other objects, advantages and novel features of the present invention will become apparent from the following detailed description of the invention when considered in conjunction with the accompanying drawings.

BRIEF DESCRIPTION OF THE DRAWINGS

FIG. 1 is a front view of a windshield with adjustable holding elements constructed in accordance with a preferred embodiment of the present invention;

FIG. 2 is an enlarged sectional view taken along line II—II of FIG. 1;

FIG. 8 is a view taken in the direction of the Arrow T of FIG. 2 of the securing element;

FIG. 9 is a main view of the eccentric control element;

FIG. 10 is a view similar to FIG. 2, illustrating another preferred embodiment of a holding element constructed in a manner similar to the embodiment of FIG. 2;

FIG. 11 is a view taken in the direction of the Arrow U of FIG. 10.

DETAILED DESCRIPTION OF THE DRAWINGS

Figure 3:
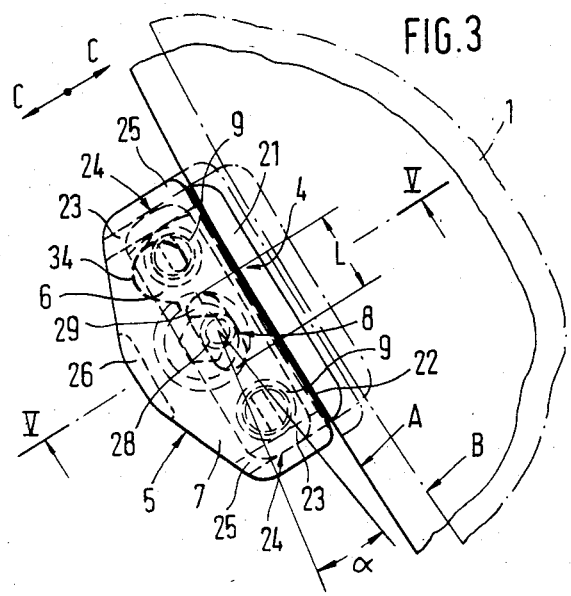
FIG. 3 is a view taken in the direction of the Arrow R of FIG. 2 excluding the vehicle body frame.

FIG. 1 shows a motor vehicle window 1 supported at the lower edge 4 by holding elements 5 which is connected to a stationary body frame 3. The window 1 can be fixed in all positions between a lower position A and an upper position B as indicated by the dash-dotted line.

FIG. 2 shows a cross-section of an embodiment of the holding element 5. Two such holding elements 5 are set apart from one another and affect the lower, transversely extending edge 4 of the window glass of the windshield 1, said holding elements 5 holding the windshield 1 in a predetermined position until the adhesive element 2 is completely hardened. The adjustable holding elements 5 also permit an adjusting of the windshield during assembly so that a simple balancing of tolerances of the installed windshield 1 is possible. By means of the holding elements 5, the windshield 1 can be fixed in all positions between a lower position A (FIGS. 1 and 3) and a dash-dotted upper position B.

Each holding element 5 has a holding plate 6 that is fastened at the body frame 3, and a supporting element 7 receiving the edge 4 of the window glass being disposed at said holding plate 6. The supporting element 7 can be moved in relation to said holding plate, as shown in FIG. 3, in longitudinal direction C—C as well as around a pivoting angle α. In addition, as shown in FIG. 5, a control element 8 that causes the adjusting movement of the windshield is arranged between the holding plate 6 and the supporting element 7.

Figure 4:
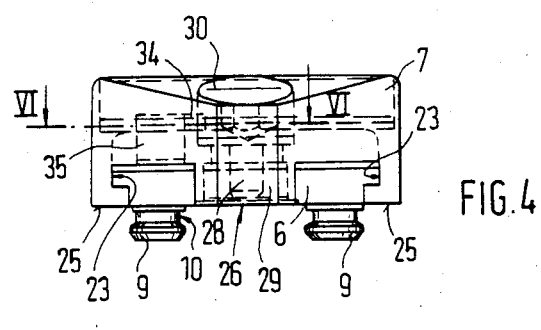
FIG. 4 is a view taken in the direction of the Arrow S of FIG. 2 excluding the vehicle body frame.

The holding plate 6 of the holding element 5 is detachably fastened at the body frame 3. As shown by FIGS. 2, 4 and 5, two bearing shafts 10 equipped with heads 9 are shaped onto the holding plate 6, said bearing shafts 10 projecting through openings 11 of the body frame 3. A plate-shaped securing element 13 being provided between the heads 9 and the interior side 12 of the body frame 3. The heads 9 have a circular shape, whereas the bearing shafts 10 in their cross-section have an approximately rectangular shape.

FIG. 8 shows the construction of the securing elements. The securing element 13 is formed by an insertable spring clip 14 which at one end 15 has an angular bend 16 that is led away from the body frame 3 and is used as a handle. The spring clip 14 has passage openings 17 for the heads 9, oblong slots 18 being connected to the passage openings, said oblong slots 18 being narrower than the passage openings 17. At both sides of the slots 18, projected wall sections 19 are arranged which interact with a contact surface 20 of the heads 9 as well as with the bearing shafts 10, as seen in FIG. 2.

Figure 5:
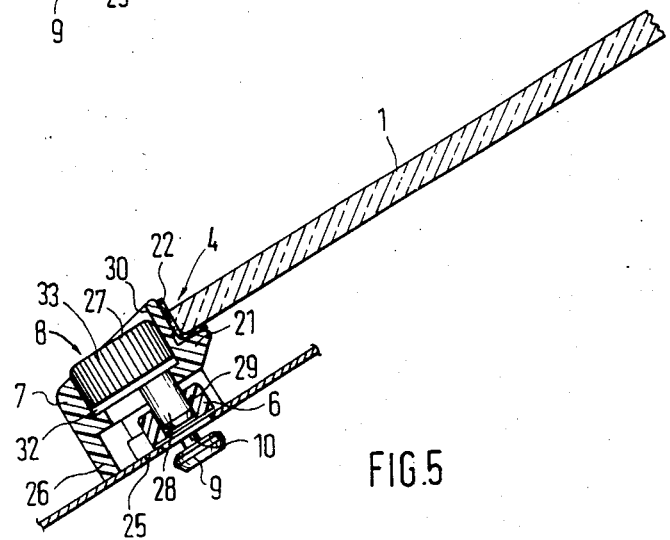
FIG. 5 is a sectional view taken along line V—V of FIG. 3 including the vehicle body frame.

As best shown by FIG. 5, the supporting element 7, on the side that faces the lower edge 4 of the window glass, has an approximately triangular-shaped projection 21, on the upper side of which the edge 4 of the window rests, with an intermediate layer 22, preferably made out of felt. The projection 21 extends over a significant portion of the width of the supporting element 7 so that a large surface area of the edge 4 of the window glass 1 always rests on the holding element 5.

As shown in FIGS. 3 and 4, the supporting element 7, by means of two groove-shaped guideways 23 projecting in downward direction at an angle, extends around the holding plate 6. The guideways 23 are, in each case, arranged at the exterior longitudinal sides of the supporting element 7. The supporting element 7, in upward direction, in the plane of the window glass (direction of the Arrow S of FIG. 2) is slid onto the holding plate 6. The ends 24 of the holding plate 6 projecting into the guideways 23 are rounded off in an arc-shaped manner, permitting a rotating movement of the supporting element 7. The supporting element 7 rests on the body frame 3 only, with two walls 25 limiting the guideways 23 and with a transverse web 26 arranged between the guideways 23.

FIG. 5 shows the first embodiment of the holding element 5, using the control element 8, shown in detail in FIG. 9. Although FIG. 9 and the following illustrate one embodiment of the control element 8, alternative embodiments of the control element and operation thereof are contemplated by this invention. The control element 8 has a cylindrical head 27 that is disposed in the supporting element 7, an eccentrically arranged control journal 28 being mounted at said head 27 on one side, said control journal 28 engaging into a slot-shaped recess 29 of the holding plate 6. The recess 29 is arranged at the side of the holding plate 6 that faces away from the bearing shafts 10. The width of the recess 29 is slightly larger than the diameter of the control journal 28, whereas the length L of the recess 29 is designed so that the control journal 28 can be turned by 360° (See FIG. 3)

Figure 6:
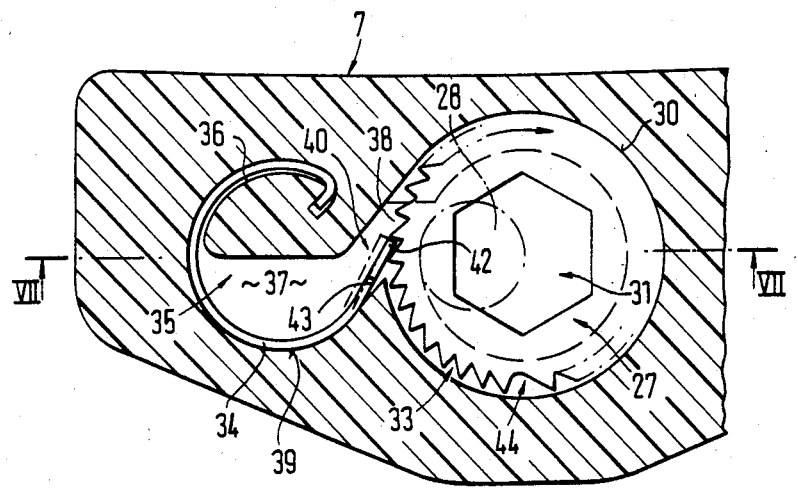
FIG. 6 is a sectional view taken along line VI—VI of FIG. 4 excluding the vehicle body frame.
Figure 7:
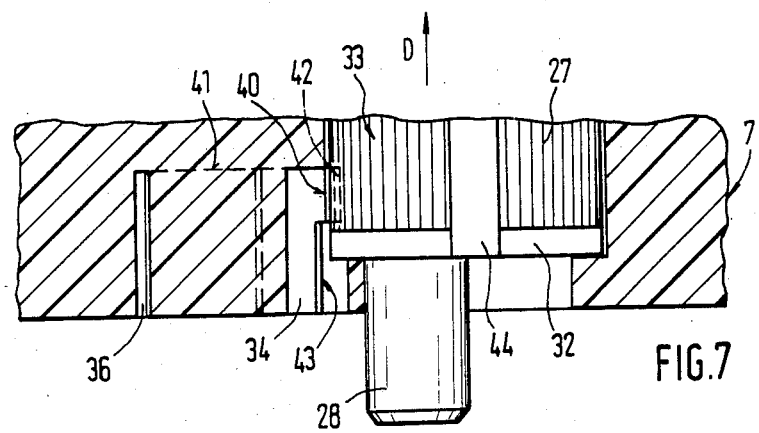
FIG. 7 is a sectional view taken along line VII—VII of FIG. 6.

The head 27 is arranged so that it is sunk in a bore 30 of the supporting element 7 and, in the side facing away from the control journal 28, has a hexagonal socket 31 so that the control element 8 can be operated with a standard tool. In addition, the head 27, at its outer surface, above a collar 32, is provided with a toothing 33 which interacts with a spring 34 mounted at the supporting element 7 in such a way that the control element 8 is fixed is the adjusted position, as shown in FIGS. 6 and 7. A self-acting adjustment, such as by the force of the windshield, for example, is thereby prevented.

As shown in FIG. 6, the serrated toothing 33 allows the head 27 to be turned in one direction only. A reverse turning is prevented by the engaging of the spring 34 and the toothing 33.

The spring 34, which is constructed as a spiral spring or a leaf spring, is inserted into a seat 35 that is provided in the supporting element 7 from the side that faces the holding plate 6. The seat 35 is comprised of an arc-shaped slot 36 and a recess 37 connected with it which, via an aperture 38, is directly connected with the bore 30.

The spring 34 is clamped in the area of the slot 36, whereas the spring section that follows only rests against the outside limiting wall 39 of the recess 37 while being prestressed. As best seen in FIG. 7, the free end 40 of the spring 34 is step-shaped in such a way that a tongue 42 of the spring 34 extending adjacent to the base 41 of the recess 37, in sections, projects into the bore 30 and interacts with the toothing 33 of the head 27. The end area 43 of the spring 34 extending below the tongue 42 has a shorter length than the tongue 42 so that this area is not in contact with the toothing 33. The tongue 42 ends above the collar 32 of the head 27.

For inserting the head 27 into the bore 30, the toothing 33 has a continuous indentation 44. After the head 27 is turned by means of a hexagonal socket screw key, the tongue 42 of the spring 34 interacts with the exterior toothing 33, the collar 32 securing the head 27 against axial shifting in the direction D.

FIGS. 10 and 11 show a second embodiment of the holding element 5, wherein a screw 45 is used as the control element 8, said screw extending approximately in parallel to the plane E-E of the glass of the window. The screw 45 is rotatably received at a widening 47 arranged in the central area of a holding plate 46 and with its end 48 facing away from the screw head, interacts with a seat 49 of a supporting element 50. The seat 49 and the end 48 of the screw 45 are preferably cup-shaped. In preferred embodiments, the seat is concave and the end of the screw is convex. The holding plate 46 and the supporting element 50 otherwise are substantially similar to the above-described first embodiment of the holding element.

The holding plate 6 and the supporting element 7 are preferably manufactured of a suitable plastic, such as polyamide, polypropylene or a similar material.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A device for the fastening of a motor vehicle window to a body frame of a motor vehicle, comprising:
    holding plate means firmly connected to said body frame,
    supporting means for supporting a lower edge of said window, said supporting means having a width transverse to the vehicle, and
    control means interposed between said supported means and said holding plate means for adjusting said supporting means in relation to said holding plate means thereby positioning said window relative to said frame substantially in a direction along a surface plane of the window,
    wherein said supporting means is movably adjustable with respect to said holding plate means to provide support to said window over a substantial portion of said width in all adjusted positions of said supporting means.

2. A device according to claim 1, including securing means for detachably fastening at said body frame said holding plate means.

3. A device according to claim 2, wherein said holding plate means includes two bearing shafts equipped with heads and said body frame includes openings for passage by said bearing shafts and wherein said securing means is plate-shaped and interposed between said heads and the interior side of said body frame.

4. A device according to claim 3, wherein said securing means is an insertable spring clip means, said spring clip means having an angular bend leading away from said body frame and used as a handle means.

5. A device according to claim 4, wherein said spring clip means includes passage openings for said bearing shafts of said holding plate means, and oblong slots connected to said passage openings, said oblong slots being narrower than said passage openings.

6. A device according to claim 1, wherein said supporting means, include groove-shaped guideways for receiving said holding plate means.

7. A device according to claim 6, wherein the ends of said holding plate means project into said guideways and are rounded off in an arc-shaped manner.

8. A device according to claim 1, wherein said control means is an eccentric cam, and is disposed between said supporting means and said holding plate means.

9. A device according to claim 1 wherein said supporting means receives a cylindrical head of said control means, and wherein said holding plate means includes a slot-shaped recess for receiving an eccentrically arranged control journal mounted at said head of said control means.

10. A device according to claim 9, including a spring means mounted at said supporting means, and a toothing on the outside surface of said head of said control means, wherein said spring means engages said toothing for permitting rotation in one direction only.

11. A device according to claim 10, wherein said head includes a collar and, wherein said toothing of said head includes a continuous indentation for allowing insertion of said head into said supporting means.

12. A device according to claim 1, wherein said control means is a screw threadably received at said holding plate means and connected with said supporting means for adjusting said supporting means relative to said holding plate means.

13. A device according to claim 12, wherein said holding plate means includes a concave seat for interacting with an end of said screw means, wherein said end is convex.

14. A device according to claim 1, wherein said holding plate means and said supporting means are plastic.

15. A device according to claim 1, including an adhesive means for fixing said window to said body frame.

16. A device according to claim 1, wherein said supporting means is pivotably connected to the holding plate means.

17. A device according to claim 1, wherein said motor vehicle window is a windshield.

18. A device according to claim 1, wherein said motor vehicle window is a rear window.

* * * * *